United States Patent [19]

Hazen

[11] Patent Number: 5,175,250
[45] Date of Patent: Dec. 29, 1992

[54] STABILIZED ROSIN AND PROCESS FOR PRODUCTION AND USE THEREOF

[75] Inventor: John C. Hazen, Spaubeek, Netherlands

[73] Assignee: Eka Nobel, Sweden

[21] Appl. No.: 727,457

[22] Filed: Jul. 9, 1991

[30] Foreign Application Priority Data

Jun. 28, 1991 [SE] Sweden ............................ 9102015

[51] Int. Cl.⁵ .............................................. C09F 1/00
[52] U.S. Cl. .................................. 530/213; 530/226; 530/233; 530/210
[58] Field of Search ................ 530/213, 226, 233, 210

[56] References Cited

U.S. PATENT DOCUMENTS

| | | | |
|---|---|---|---|
| 3,663,523 | 10/1969 | Parkin et al. | 530/213 |
| 3,872,073 | 3/1975 | Thorpe et al. | 260/106 |

FOREIGN PATENT DOCUMENTS

| | | | |
|---|---|---|---|
| 00074544 | 3/1983 | European Pat. Off. | |
| 0275851 | 7/1988 | European Pat. Off. | |
| 0165499 | 10/1982 | Japan | 530/213 |
| 472143 | 9/1975 | Sweden | |

OTHER PUBLICATIONS

Modern Surface Coatings by Paul Nylen & Edward Sunderland Interscience Publishers, 1965—pp. 133–141.

Primary Examiner—John Kight, III
Assistant Examiner—Richard L. Jones
Attorney, Agent, or Firm—Fred Phipitt

[57] ABSTRACT

A process for the production of a stabilized rosin and a stabilized rosin obtainable by the process. According to the process rosin is heated in the presence of a phosphoric acid or a strong acid in combination with a phosphate containing substance and disproportionated by addition of iodine. Preferably the rosin is first heated in the presence of the phosphoric acid or the strong acid in combination with the phosphate containing substance and thereafter disproportionated by the addition of iodine. Iodine is preferably added in at least two steps and the disproportionation is allowed to proceed between each step. The stabilized rosin can be used as a tackifier resin in adhesives and as a sizing agent for paper, paper boards and similar products.

4 Claims, No Drawings

STABILIZED ROSIN AND PROCESS FOR PRODUCTION AND USE THEREOF

The present invention relates to a new stabilized rosin and the production thereof. The rosin can be used as a tackifier for adhesives and in sizing compositions.

It is common to include tackifiers when formulating an adhesive composition. The tackifiers facilitate the coating process for the adhesives and do also improve the adhesive properties such as tackiness, peel-resistance and ease of surface wetting. The tack of an adhesive enables it to form an immediate bond between contacted surfaces when they are brought together.

Tackifier resins can be divided mainly into two groups, rosin and derivatives thereof and hydrocarbon resins.

It is also well known to use rosin as sizing agents for paper, paper boards and similar products.

Rosin is a natural product obtained from the exudation of trees of the family Pinus. Rosin consists of about 90 per cent or more of mixed unsaturated acids. The rosin acids are mainly monobasic carboxylic acids, all containing the phenanthrene skeleton and all having 20 carbon atoms in the molecule, the main difference between the acids being the number and position of the double bonds. The acids can have conjugated double bonds like in abietic acid or a non-conjugated double bond as in pimaric acid. Natural rosin may be classified in several types due to its origin. There are, gum rosin, wood rosin and tall oil rosin (for further information see e.g. "Modern Surface Coatings" Paul Nylen et al, Interscience Publishers 1965, p 133-137).

Because of its structure, rosin is generally unsuited for use in adhesive formulations. The double bonds of the rosin acids result in instability against oxidation and the isomer composition causes the rosin to crystallize. Therefore rosin must be subjected to chemical reactions altering the double bond position and changing the rosin acid isomer composition. Processes for stabilizing rosin are well known. One such process is the disproportionation reaction involving transferring of hydrogen atoms from one molecule of abietic acid to another. The reaction is carried out by heating the rosin together with catalysts.

The majority of tackifiers are soft resins having a softening point within the range of 40°-60° C. (Ring and Ball, ASTM). The initial rosins however, have a much higher softening point. Therefore it is common to soften the rosin with liquid resins after the stabilization step.

The high softening point of rosin is also a disadvantage when the rosin is used as a sizing agent. For sizing purpose it is common to use the rosin as rosin dispersions and a high softening point means that very high temperatures are required at the preparation of such rosin dispersions. This is undesirable both from an economical as well as tecnical point of view. A too high softening point for the rosin may also give an impaired sizing effect.

It is accordingly an object of the present invention to obtain a soft stabilized tackifier resin in a more simple manner.

It is further an object of the present invention to obtain a stabilized rosin with a very low and stable softening point and with a light colour.

It is further an object of the present invention to obtain a rosin sizing agent with improved properties.

The objects of the invention are achieved by a process, as claimed in the claims, in which rosin is heated in the presence of a phosphoric acid or a strong acid in combination with a phosphate containing substance and disproportionated by addition of iodine. The process results in a new, soft, stabilized rosin with light colour which is suitable as a tackifier and as a sizing agent.

With the present invention liquid rosin acid isomers are formed during the stabilization process. Thereby the need for addition of liquid resin afterwards is eliminated or at least minimized. Furthermore the crystallization tendency is reduced or eliminated.

The treatment with a phosphoric acid or a combination of a strong acid and a phosphate containing substance is made to inactivate iron impurities which emanates from the rosin being a natural product and being handled in metallic equipment. The iron inactivation is opposite to the state of the art. It is very common to use iodine and an iron compound as a combined catalyst for disproportionation. In the present invention however, it was found that the different levels of iron caused the final disproportionated resin to be variable in colour and softening point. Therefore it was necessary to inactivate the iron contaminations to obtain a stable softening point and light colour for the stabilized rosin Iodine is a well known catalyst for disproportionation of rosin. In known processes using iodine the disproportionation results in the formation of dehydroabietic acid as the main component. With the present invention however, the stabilized rosin contains predominantly secodehydroabietic acids and dehydrodehydroabietic acid.

The phosphoric acid should be added from the beginning of the treatment to ensure deactivation of the iron. The deactivation of iron results in the formation of a higher amount of the liquid secodehydroabietic acids and dehydrodehydroabietic acid and a lower amount of the non liquid dehydroabietic acid. The total amount of iodine for the disproportionation can be added together with the phosphoric acid. However a higher level of the desired liquid rosin acids is obtained if the phosphoric acid is allowed to react for some time before the iodine is added. A still better result is achieved if iodine is added in at least two steps. This is a preferred embodiment of the invention. Iodine functions as a catalyst but loses activity with time when used to catalyse bond rearrangements in rosin. The rosin is heated during a certain time after each addition of iodine. In this way the iodine disproportionation of the rosin is made in a delayed way and thereby the formation of secodehydroabietic acid and dehydrodehydroabietic acid is maximized and the formation of dehydroabietic acid minimized. These steps are essential to obtain a stabilized product with a high content of secodehydroabietic acid. The high content of secodehydroabietic acids is the reason for the low softening point.

The rosins used in the present invention are known types of rosin such as gum-, wood- and tall oil rosin.

In the process according to the invention the rosin is heated, suitably in an inert gas atmosphere, to temperatures from about 120° to about 280° C. The phosphoric acid is added in an amount from 0,005 to 0.5 per cent by weight of the rosin, preferably 0.02-0.05 per cent and the temperature is preferably between 140° C. and 200° C. The expression a phosphoric acid is meant to include phosphoric acid as well as poyphosphoric acid or any substance generating phosphoric acid. It is also possible to use a strong acid in combination with a phosphate containing substance. With a strong acid is meant an acid with a PKA value of 4 or less. Suitably the reaction is carried on for a period of from about 2 to 120 minutes, preferably from 10 to 30 minutes before the iodine is added. The total amount of iodine added is 0.2 to 1 per cent by weight. Preferably iodine is added in at least two steps. Then the iodine addition in the first step should not be more than 80 per cent by weight of the total amount of iodine. Suitably iodine is added in an amount of 0.15 to 0.6 per cent by weight of the rosin preferably 0.3 to 0.5 per cent in the first step. The temperature is changed to a value within the interval from about 180° to about 250° C., preferably from about 200° to 230° C. After a reaction time of from about 15 minutes to about 10 hours, preferably from 1 to 3 hours an additional amount of iodine is added. This amount is suitably 0.05 to 0.4 per cent by weight of the rosin, preferably 0.15 to 0,3 per cent. The reaction is proceeded at the same temperature for a period of about 15 minutes to about 10 hours, preferably from 2 to 6 hours. Then the resin is cooled.

The obtained new stabilized rosin product comprises (in per cent by weight):

| | |
|---|---|
| Secodehydroabietic acids in an amount of | 5-30% |
| Dehydrodehydroabietic acids in an amount of | 3-20% |
| Dehydroabietic acid in an amount of | 8-40% |
| Abietic acid in an amount of | 0-5% |
| Preferably the new stabilized rosin product comprises (in percent by weight): | |
| Secodehydroabietic acids in an amount of | 10%-30% |
| Dehydrodehydroabietic acids in an amount of | 7%-20% |
| Dehydroabietic acid in an amount of | 10%-30% |
| Abietic acid in an amount of | 0%-5% |
| and most preferably: | |
| Secodehydroabietic acids in an amount of | 15%-30% |
| Dehydrodehydroabietic acids in an amount of | 9%-20% |
| Dehydroabietic acid in an amount of | 11%-23% |
| Abietic acid in an amount of | 0%-5% |

The stabilized rosin has a softening point from about 40° to about 75° C. (Ring and Ball), preferably from about 40° to about 60° C. and most preferably from about 40° to about 48° C. The colour value (Gardner; 50% in toluene) is 4 to 7, preferably 4 to 6. The acid value (mg KOH/gr) is 146-170, preferably 146-160.

With the present process the stabilization of the rosin and the final softening correction have been combined into one process whereby at the same time the crystallization tendency has been reduced or eliminated. The invention makes the total production process more simple and less costly than known processes. When used in adhesive formulations the new, soft, stabilized rosin results in adhesive with better final adhesive properties. Especially adhesion to apolar surfaces like polyolefinic films is increased in some standard formulations. The new rosin can be used as a tackifier resin in adhesives based on a lot of different polymers such as acrylates, styrene-butadiene rubbers, ethylene-vinyl acetate and polyvinyl acetate. The amount of tackifier used when formulating the adhesive composition is different for the different polymers. For acrylates for example from about 10 up to 40 per cent of tackifier (based on the adhesive) can be used. For the styrene-butadiene rubber a suitable amount is from about 10 to 60 per cent. The adhesive composition can be applied as a hot melt, as a solution in a solvent or as a latex.

The new soft stabilized rosin can also be used for sizing applications, to produce as well internal sizing agents as surface sizing agents with improved properties.

Rosin is well known as a sizing agent and it is mainly used as aqueous rosin dispersions at a pH of 4-5 and in combination with poly aluminum chloride and/or alum at a pH of 6.5-7.5. The disadvantage with rosin as a sizing agent besides the limitations with regard to the pH is that the softening point for the rosin is usually high. A high softening point means that very high temperatures are required at the preparation of the aqueous rosin dispersion, which is unfavorable both from an economical and technical point of view. A too high softening point for the rosin also gives an impaired sizing effect.

It is also well known to use aqueous dispersions of synthetic sizing agents, such as ketene dimeres, acid anhydrides, isocyanates and carbamoyl chlorides. These sizing agents are efficient over a wide pH range and also at a high pH. The disadvantages with these agents are the decreased friction, especially after calendering, and the reduced gloss of the sized paper.

In order to obtain a more widely useful sizing agent it is known to combine rosin and synthetic sizing agents. The combination can be made according to EP 74 544 in which the sizing dispersion contains particles of rosin as well as particles of synthetic sizing agent. The combination can also be made according to EP 275 851 in which the dispersed phase contains particles of a homogenous mixture of the rosin and the synthetic sizing agent. Also when combining the rosin and the synthetic sizing agent a high softening point is a draw back both regarding to heating costs and regarding to the stability of the synthetic sizing agent.

The new soft stabilized rosin according to the present invention can be used to produce sizing dispersions according to any known method, but without the draw backs of these methods. The low softening point is advantageous when producing both plain rosin dispersions as well as dispersions of both rosin and synthetic sizing agents. The dispersions can be anionic, cationic or nonionic by using the mentioned types of dispersion agents. Other known compounds such as poly aluminum compounds can be incorporated. The dispersions can be prepared by conventional technique, i.e. by homogenizing the active substance in water, in the presence of a dispersion agent, using high shear forces, so that fine particles, generally with a size below or about 0.8 μm are obtained as the dispersed phase. However, the temperature can be kept lower than normally used. The temperature is suitably about 50° to 85° C., preferably about 60° to 75° C. Normally the temperature used with standard rosins is within the range 105° to 140° C.

When the rosin is used in combination with a synthetic sizing agent as mentioned above the amount of rosin and synthetic sizing agent can vary within wide limits. For dispersions with higher amounts of rosin the amount of rosin is suitably 96 to 80 per cent by weight of the total amount of rosin and synthetic sizing agent, preferably 96 to 90 per cent. For dispersions with lower amounts of rosin and higher amounts of synthetic sizing agent the content of rosin is suitably 10 to 60 per cent, preferably 20 to 40 per cent.

The dry contents, the total amount of sizing agents, of the dispersions should be within the range of from 4 to 25 per cent by weight and suitably within the range of from 10 to 20 per cent by weight.

The invention is now illustrated by means of the following examples, where parts and percentages mean parts by weight and percentages by weight, unless otherwise specified.

EXAMPLE 1

Chinese gum rosin is heated to 160° C. under nitrogen gas atmosphere. 0.04% phosphoric acid is added and the reaction is carried on for 15 minutes. Then 0.4% iodine is added and the temperature is raised to 225° C. After 2 hours at 225° C. another 0.2% iodine is added and the reaction is proceeded for another 4 hours. Then the resin is cooled. The obtained resin has the following properties:

| | |
|---|---|
| Softening point (R and B): | 42° C. |
| Acid value: | 152 mg KOH/g |
| Colour (Gardener; 50% tol.): | 6 |
| The rosin product comprises: | |
| Secodehydroabietic acids: | 23.5% |
| Dehydrodehydroabietic acids: | 17.6% |
| Dehydroabietic acid: | 17.6% |
| Abietic acid: | 0.2%. |

The content of the rosin product was measured with capillary GLC (using BDS-column).

EXAMPLE 2

An adhesive formulation was prepared comprising 75 parts (dry) of an acrylate polymer and 25 parts (dry) of a tackier rosin produced according to example 1. A 80 g paper (dry) was coated with 20 g/m2 of the adhesive formulation. The adhesive result was as follows compared with a standard formulation comprising Acronal - V205 (from BASF) and Snowtac 801F.

| Shear(glass) (hr) | Peel(glass) (N/2.5 cm) | Peel(PE) (N/2.5 cm) | Tack(steel) (N/2.5 cm) | Tack(PE) (N/2.5 cm) |
|---|---|---|---|---|
| standard 30 | 13 | 15 | 12 | 10 |
| new resin 21 | 26 | 21 | 19 | 9 |

EXAMPLE 3

25 parts of rosin produced according to example 1 was mixed into 75 parts of alkyl ketene dimer (A.K.D.) wax at 70°-75° C.

100 parts of this mixture was stirred into an aqueous solution of 350 grams water containing 0.5 g anionic surfactant (sodium-lignosulfonate) and 25 g of a 50% dry solids cationic polymer. (Dimethylamine epichlorhydrin copolymer)

This aqueous mixture was stirred and homogenized under 200 bar pressure at 65°-75° C. and diluted to the correct dry solids content. The obtained dispersion had a particle size of less than 0.70 micron, and was highly cationic and had a good mechanical shear and storage stability.

This dispersion was tested on sizing efficiency and compared with a standard cationic sizing dispersion containing alkyl ketene dimer called Keydime D-10:

| COMPOSITION: | Dispersion acc. to the invention | KEYDIME D-10 (Stand.) |
|---|---|---|
| Total dry solids | 12.5% | 12.5% |
| A.K.D. contents | 7.5% | 10.0% |
| Rosin contents | 2.5% | — |
| Polymer (dry) | 2.5% | 2.5% |

SIZING TEST NO.: P 1209

Paper sheets where prepared on a laboratory sheet former (System: Rapid Kothen) according D.I.N. 54358. The fibres were a mixture of bleached sulphite and sulphate, and beaten to a Freeness of 40° S.R. The pH of the system was 7 (No alum and/or poly aluminum chloride (P.A.C.) added). The drying time was 5 minutes at 96° C. under vacuum. The conditioning was 24 hours at 23° C. and 50% relative humidity. The sizing level was: 0.5% dry size to dry fibres. The weight of paper was: 77 g/m².

Sizing was tested by Cobb values at 60 seconds according Tappi standard T 441 om-84.

| SIZING RESULTS: | COBB 60 |
|---|---|
| Keydime D-10 (Standard) | 19.8 |
| Dispersion acc. to invention | 20.0 |

FRICTION TEST

The prepared sheets where calandered at 50° C. and 16 bar pressure. The friction was tested as static friction by measuring the angle on the PAAR Static and Dynamic friction tester. (The greater the angle, the better the friction.)

The result was as well as for a paper sized with a conventional rosin dispersion (Bumal 30) sized paper.

This paper was rosin sized at PH 4.5 with alum having a Cobb value of 24.2 (Test P 1123).

| RESULTS: | ANGLE |
|---|---|
| Keydime D-10 (Standard) | 20.8° |
| Dispersion acc. to invention | 25.8° |
| Bumal 30 | 30.0° |

I claim:

1. A process for the production of a stabilized rosin wherein rosin is heated in the presence of a phosphoric acid or a strong acid in combination with a phosphate containing substance and at the same time or later disproportionated by addition of iodine.

2. A process according to claim 1, wherein the rosin is first heated in the presence of the phosphoric acid or the strong acid in combination with the phosphate containing substance and thereafter the rosin is disproportionated by the addition of iodine.

3. A process according to claim 2, wherein iodine is added in at least two steps and the disproportionation is allowed to proceed between each step.

4. A process according to claim 1, wherein the amount of phosphoric acid or strong acid in combination with a phosphate containing substance counted as amount of phosphoric acid added, is 0.005-0.5 per cent by weight of the rosin and the total amount of iodine 0.2 to 1 per cent by weight of the rosin and the iodine added in the first step is not more than 80 per cent by weight of the total amount of iodine.

* * * * *